(12) United States Patent
Harada et al.

(10) Patent No.: US 9,368,781 B2
(45) Date of Patent: Jun. 14, 2016

(54) TERMINAL PORTION FOR STORAGE BATTERIES, PLASTIC ENCAPSULATED TERMINAL FOR STORAGE BATTERIES, METHOD FOR PRODUCING THE SAME, STORAGE BATTERY PROVIDED WITH TERMINAL PORTION, AND AUTOMOBILE EQUIPPED WITH STORAGE BATTERY

(75) Inventors: Aya Harada, Kyoto (JP); Eiji Hojo, Kyoto (JP); Yasuhide Nakayama, Kyoto (JP); Shin Osaki, Kyoto (JP); Hiroshi Okumura, Kyoto (JP); Katsuya Noguchi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 63 days.

(21) Appl. No.: 14/128,246

(22) PCT Filed: Jun. 18, 2012

(86) PCT No.: PCT/JP2012/065455
§ 371 (c)(1),
(2), (4) Date: Dec. 20, 2013

(87) PCT Pub. No.: WO2013/002049
PCT Pub. Date: Jan. 3, 2013

(65) Prior Publication Data
US 2014/0212739 A1    Jul. 31, 2014

(30) Foreign Application Priority Data

Jun. 27, 2011 (JP) ................................. 2011-141434
Jun. 27, 2011 (JP) ................................. 2011-141436
Jun. 29, 2011 (JP) ................................. 2011-144195
Jul. 6, 2011 (JP) ................................. 2011-149699
May 11, 2012 (JP) ................................. 2012-109045

(51) Int. Cl.
*H01M 2/30* (2006.01)
*H01M 2/02* (2006.01)
*H01R 43/00* (2006.01)

(52) U.S. Cl.
CPC ............ *H01M 2/305* (2013.01); *H01M 2/0242* (2013.01); *H01M 2/30* (2013.01); *H01R 43/00* (2013.01); *H01M 2220/20* (2013.01); *Y10T 29/49208* (2015.01)

(58) Field of Classification Search
CPC ..... H01M 2/305; H01M 2/30; H01M 2/0242; H01R 43/00; Y10T 29/49208
See application file for complete search history.

(56) References Cited

U.S. PATENT DOCUMENTS 329,547 A * 11/1885 Goodrich et al. ............. 411/295
2,622,120 A   12/1952 Gribik
(Continued)

FOREIGN PATENT DOCUMENTS

EP    2273586 A1    1/2011
JP    53036644 A2   4/1978
(Continued)

OTHER PUBLICATIONS

Oxford Pocket American Dictionary and Thesaurus 3rd ed. (p. 82, New York, Oxford University Press (C) 2010 taken as January).*
(Continued)

*Primary Examiner* — Patrick Ryan
*Assistant Examiner* — Aaron Greso
(74) *Attorney, Agent, or Firm* — Rankin, Hill & Clark LLP

(57) ABSTRACT

A storage battery includes a terminal portion for storage batteries having a plurality of bolt insertion holes bored in one or a plurality of directions, a nut insertion opening through which a nut is inserted, a hollow in communication with the bolt insertion holes and the nut insertion opening and the nut having at least one screw hole threaded in a direction coincident with at least one or the plurality of directions. A fixation portion is formed to fix the nut by deforming the terminal portion with the nut being inserted through the nut insertion opening into the hollow and the at least one screw hole of the nut being in communication respectively with the at least one of the plurality of bolt insertion holes.

18 Claims, 19 Drawing Sheets

(56) References Cited

U.S. PATENT DOCUMENTS

| | | | |
|---|---|---|---|
| 4,898,796 A * | 2/1990 | Furukawa et al. ............ 429/178 |
| 4,938,706 A | 7/1990 | Sykes |
| RE34,744 E | 9/1994 | Sykes |
| 2002/0114994 A1 | 8/2002 | Nakano |
| 2011/0039153 A1 | 2/2011 | Egami |
| 2012/0263997 A1 | 10/2012 | Haruyama et al. |
| 2012/0264002 A1 | 10/2012 | Osaki et al. |

FOREIGN PATENT DOCUMENTS

| | | | |
|---|---|---|---|
| JP | 61-70367 | 5/1986 | |
| JP | 6170367 | 5/1986 | |
| JP | 2-82879 | 6/1990 | |
| JP | 07-027053 | 1/1995 | |
| JP | 0727053 | 5/1995 | |
| JP | 07-320718 | 12/1995 | |
| JP | 10012292 A2 | 1/1998 | |
| JP | 11-154503 | 6/1999 | |
| JP | 11154503 A2 | 6/1999 | |
| JP | 2000-260420 | 9/2000 | |
| JP | 2001-283825 | 10/2001 | |
| JP | 2001283825 A2 | 10/2001 | |
| JP | 2003317689 A2 | 11/2003 | |
| JP | 2007317560 A2 | 12/2007 | |
| JP | 2009026463 A2 | 2/2009 | |
| JP | 1396609 | 9/2010 | |
| JP | 2011-076929 | 4/2011 | |
| JP | 2011-134585 | 7/2011 | |
| JP | 2011-134586 | 7/2011 | |
| JP | 2011-134587 | 7/2011 | |
| WO | WO 2010/098796 | * 9/2010 | ............ H01M 4/20 |
| WO | 2011/078209 | 6/2011 | |

OTHER PUBLICATIONS

Ajax Fasteners ({http://www.ajaxfast.com.au/downloads/Technical%20noteFunction%20of%20a%20Washer.pdf} on web 2006 per Wayback Machine}).*

Hojo, Eiji et al. "Valve Regulated Lead-acid Battery with Higher Performance and Higher Reliability for Motor Cycle-use : High Cranking Performance GYZ20HL Type Battery with New Terminal for Convenient Wire Connection" GS Yuasa Technical Report, pp. 39-46, 2009.; English abstract.

International Search Report dated Jul. 17, 2012 filed in PCT/JP2012/065455.

Extended European Search Report dated Jan. 13, 2015 issued in the corresponding European patent application No. 12804399.9.

* cited by examiner

TERMINAL PORTION FOR STORAGE BATTERIES, PLASTIC ENCAPSULATED TERMINAL FOR STORAGE BATTERIES, METHOD FOR PRODUCING THE SAME, STORAGE BATTERY PROVIDED WITH TERMINAL PORTION, AND AUTOMOBILE EQUIPPED WITH STORAGE BATTERY

FIELD

The present invention relates to a terminal portion for storage batteries, a plastic encapsulated terminal for storage batteries, a method for producing the same, a storage battery provided with the terminal portion, and an automobile equipped with the storage battery.

BACKGROUND

A plastic encapsulated terminal is often used in a terminal structure of lead-acid storage batteries for motorcycles.

A plastic encapsulated terminal as shown in FIG. 14 is conventionally known to the public (see Patent Literature 1). In FIG. 14, 11 denotes a terminal portion composed of a rectangular cube, 12 denotes a circular cylindrical pole portion, 13 denotes a base in the form a plate, and 14 denotes a plastic portion composed of polypropylene, polyethylene, or the like. The terminal portion 11 has a lower end integrally coupled to an upper end of the pole portion 12, and the pole portion 12 has a lower end integrally coupled to an upper end of the base 13. The terminal portion 11 has a nut insertion hole 11a bored therethrough from a side surface on the front side to a side surface on the back side in FIG. 14, and bolt insertion holes 11b and 11c bored respectively from a top surface and a left side surface toward the hole 11a. The pole portion 12 has a circular deburring flange 12a formed around its circumferential surfaces at the uppermost part, and three ribs of flanges 12b, 12c, and 12d, formed below the deburring flange 12a at intervals, each having a radius smaller than that of the deburring flange 12a. The deburring flange 12a has a circumferential surface projecting in the horizontal direction from the circumferences at the lower end of the terminal portion 11. The plastic portion 14 is formed in the surroundings of the pole portion 12 so as to wrap the deburring flange 12a and the flanges 12b, 12c, and 12d, then slightly extends outward from the upper end of the flange 12a, and rises upward so as to cover the circumferential surfaces in the lower part of the terminal portion 11 via a groove 15.

Conventionally, in the terminal portion 11 of such a plastic encapsulated terminal for lead-acid storage batteries as mentioned above, an end user inserts a rectangular cuboid nut into the nut insertion hole 11a and thereafter inserts a bolt into one of bolt insertion holes 11b and 11c formed respectively through the top surface and the left side surface, so as to allow the bolt to be threadedly engaged. Therefore, in attempts to insert the nut into a small hollow in the terminal portion, the end user may sometimes drop the nut, which has been a problem.

Further, such a nut as disclosed in Patent Literature 1 has one screw hole, and thus the bolt can be inserted into only either one of the bolt insertion holes 11b and 11c formed respectively through the top surface and the left side surface. Therefore, it has been impossible to connect an external lead wire at each of two points at the same time, and thus it has been necessary to adjust the direction of the nut each time so that the bolt insertion hole and the screw hole of the nut that are selected for connection of the external lead wire should be coincident.

Meanwhile, as a lead-acid storage battery in which a nut is pre-fixed to a terminal, an invention of "a lead-acid storage battery characterized by including: a lead-acid storage battery body; a hollow box terminal, fixed to the lead-acid storage battery body, having one surface through which a nut insertion opening is opened and at least one other surface than the one surface through which a bolt insertion through hole is opened; a nut, having outer dimensions slightly smaller than the inner dimensions of the box terminal, having an internal thread hole facing the bolt insertion through hole, and housed within the box terminal through the nut insertion opening in a posture such that the internal thread hole and the bolt insertion through hole face each other, and a nut latch provided on a cover of the lead-acid storage battery body so as to close at least part of the nut insertion opening" is publicly known (see Patent Literature 2). However, this invention has a problem of the need for separately providing a means for closing the part of the nut insertion opening to fix the nut to the terminal.

Further, Patent Literature 2 discloses, "The bolt insertion through hole 9 provided in the box terminal 4 may be provided not only through the aforementioned end surface on the front side but also through the upper surface or the back surface of the box terminal 4 in a plural number. This allows the lead wire that is connected to each of the terminal portions 3a and 3b to be attached in a plurality of directions depending on the shape of the box terminal 4, which is one type, and the direction in which the nut 6 is housed within the box terminal 4" (paragraph [0023]); however, since the nut 6 has only one internal thread hole 10, the lead wire cannot be attached thereto at each of two points at the same time, as shown in FIG. 2.

Further, a registered design of "a terminal fitting for storage batteries" (see Non Patent Literature 1) is publicly known. The article according to this design is described as: "The article according to the design of the subject application is a terminal fitting for storage batteries, which is characterized by having a configuration in which two circular through holes are provided at positions offset from each other respectively through an upper surface and a front surface of a substantially rectangular cuboid terminal portion, and a substantially U-shaped projection is provided on a bottom surface".

Non Patent Literature 2 suggests that a nut is fixed within a hollow of such a storage battery terminal as mentioned above in which two circular through holes (holes) are provided at positions offset from each other respectively through the upper surface and the front surface of the substantially rectangular cuboid terminal portion. It reads, "In order to improve convenience and functionality of the terminal, it is made possible to attach a harness at each of two points respectively on the upper surface and the front surface of the terminal at the same time. For achieving this, a lead bushing terminal shape as shown in FIG. 3 is employed, and the positions of holes in the nut are designed to be compatible with existing batteries. Further, the terminal is designed so as to have a width larger than that of existing batteries by 3.5 mm or 4.5 mm, and the axes of the holes respectively through the upper surface and the front surface are offset from each other by 6.5 mm, so that the harness can be fixed at each of two points at the same time, as shown in FIG. 4, without the two holes intersecting each other within the terminal" (line 2 to line 11 in the right, column of page 43), and "The nut is inserted into a special lead bushing terminal that has been newly developed in order to fix the nut to the terminal in the battery production process. Thus, a technique for fixing the nut to the terminal at the time of plastic molding of the cover has been established. This prevents, in a GYZ20HL battery, the nut from falling from the terminal, even if the battery is turned over on its side so that the nut insertion opening in the terminal faces downward (see FIG. 6)" (line 6 to line 11 in the left column of page 45). However, a specific method for fixing the nut is not disclosed therein.

CITATION LIST

Patent Literature

Patent Literature 1: JP 11-154503 A
Patent Literature 2: JP 2001-283825 A

Non Patent Literature

Non Patent Literature 1: Japanese Design Registration No. 1396609
Non Patent Literature 2: "GS Yuasa Technical Report", December 2009, Vol. 6, No. 2, page 39 to page 46

SUMMARY

Technical Problem

The present invention aims to solve the problems as mentioned above, and an object thereof is to provide a terminal portion for storage batteries that enables a nut to be fixed easily and reliably so that the nut does not fall therefrom, and a terminal portion for storage batteries that enables a bolt to be inserted into the nut by selecting either one point through the upper surface or the front surface, or two or more points therethrough at the same time, even if the nut is fixed to the terminal portion when connecting an external lead wire to a storage battery. It is another object of the present invention to provide a storage battery including such a terminal portion for storage batteries.

Solution to Problem

In order to solve the above-mentioned problems, the present invention employs the following means:
(1) A terminal portion for storage batteries, including: a plurality of bolt insertion holes bored in a plurality of the same and/or different directions; a nut insertion opening through which a nut having at least one screw hole threaded in a direction coincident with at least one of the plurality of the same and/or different directions is inserted; a hollow in communication with the bolt insertion holes and the nut insertion opening; and a fixation portion configured to fix the nut by deforming the terminal portion with the nut being inserted through the nut insertion opening into the hollow and the at least one screw hole of the nut being in communication respectively with the at least one of the plurality of bolt insertion holes;
(2) The terminal portion for storage batteries according to (1), wherein the fixation portion is a projecting portion projecting in the hollow direction in a part, facing the hollow, on an inner surface of the terminal portion;
(3) The terminal portion for storage batteries according to (1) or (2), wherein the fixation portion is a part of the nut insertion opening that is narrowed after the nut is inserted into the hollow of the terminal portion;
(4) The terminal portion for storage batteries according to (3), wherein the hollow of the terminal portion is elongated in a direction in which the nut is inserted, and the nut is arranged at a position on the back side, as seen from the nut insertion opening of the hollow of the terminal portion;
(5) The terminal portion for storage batteries according to (1) or (2), wherein the fixation portion is a part of a sidewall or ceiling of the terminal portion in which a recess is provided after the nut is inserted into the hollow of the terminal portion;
(6) The terminal portion for storage batteries according to any one of (1) to (5), wherein the plurality of bolt insertion holes are bored at such positions as not to intersect each other within the hollow of the terminal portion, and the plurality of screw holes of the nut are formed at such positions as not to intersect each other;
(7) The terminal portion for storage batteries according to any one of (1) to (5), wherein the plurality of bolt insertion holes are bored at such positions as to intersect each other within the hollow of the terminal portion, and the plurality of screw holes of the nut are formed at such positions as to intersect each other;
(8) The terminal portion for storage batteries according to any one of (1) to (7), wherein the hollow of the terminal portion has a large width at the nut insertion opening and a reduced width on the back side;
(9) A plastic encapsulated terminal for storage batteries, including: a terminal portion; a pole portion coupled to a lower end of the terminal portion; and a plastic portion surrounding a circumferential surface of the pole portion, wherein the terminal portion is the terminal portion according to any one of (1) to (8);
(10) A method for producing a plastic encapsulated terminal for storage batteries, the terminal including: a terminal portion having a plurality of bolt insertion holes bored in a plurality of the same and/or different directions, a nut insertion opening through which a nut having at least one screw hole threaded in a direction coincident with at least one of the plurality of the same and/or different directions is inserted, and a hollow in communication with the bolt insertion holes and the nut insertion opening; a pole portion coupled to a lower end of the terminal portion; and a plastic portion surrounding a circumferential surface of the pole portion, the method including a step of fixing the nut by deforming the terminal portion with the nut being inserted through the nut insertion opening into the hollow and the at least one screw hole of the nut being in communication respectively with the at least one of the plurality of bolt insertion holes;
(11) The method for producing a plastic encapsulated terminal for storage batteries according to (10), wherein the nut is fixed, after the nut is inserted into the hollow, by narrowing the nut insertion opening through application of a pressure, or providing a recess on a sidewall or ceiling of the terminal portion;
(12) The method for producing a plastic encapsulated terminal for storage batteries according to (10), wherein the nut is fixed, after the nut is inserted into the hollow, by deforming the terminal portion by heating;
(13) The method for producing a plastic encapsulated terminal for storage batteries according to (10), wherein the nut is fixed, after the nut is inserted into the hollow of the terminal portion, by placing the terminal portion into a plastic mold for plastic molding and applying a pressure to a wall of the terminal portion using a pressing pin provided in the plastic mold for plastic molding, thereby providing a recess on the wall;
(14) A storage battery including: a battery case inside of which is partitioned by partition walls into a plurality of cells and in which an electrode assembly is housed in each of the cells; and a cover lying over the battery case from above, wherein the cover includes the terminal portion according to any one of (1) to (8); and

(15) An automobile equipped with the storage battery according to (14).

In a commonly employed nut or rectangular cuboid terminal portion, the "different directions", for example, are a direction from "the upper surface to the lower surface" and a direction from "the front surface to the back surface". The "same direction", for example, is either one of the above-mentioned directions. Further, "a plurality of bolt insertion holes bored in a plurality of the same and/or different directions", for example, mean: one bolt insertion hole bored in a direction from "the upper surface to the lower surface" and at least one bolt insertion hole bored in a direction from "the front surface to the back surface"; at least one bolt insertion hole bored in a direction from "the upper surface to the lower surface" and one bolt insertion hole bored in a direction from "the front surface to the back surface"; at least two bolt insertion holes bored in each of a direction from "the upper surface to the lower surface" and a direction from "the front surface to the back surface"; or at least two bolt insertion holes bored in a direction from "the upper surface to the lower surface" or a direction from "the front surface to the back surface". The "nut having at least one screw hole threaded in a direction coincident with at least one of the plurality of the same and/or different directions", for example, means a nut having: at least one screw hole in a direction from "the upper surface to the lower surface" (none in a direction from "the front surface to the back surface"); at least one screw hole in a direction from "the front surface to the back surface" (none in a direction from "the upper surface to the lower surface"); or at least one screw hole in each of a direction from "the upper surface to the lower surface" and a direction from "the front surface to the back surface". The "plurality of the same or different directions" are not limited to the above-mentioned directions, and includes a direction from "the right (left) side surface to the left (right) side surface". Further, the "plurality" does not mean "many", and the number is generally 2 to 10, preferably 2 to 4. The "at least one" means a number that corresponds to one or the above-mentioned "plural" number, and is preferably at least two.

In the description of the present application, the "upper surface" and "lower surface" are not limited to the horizontal surfaces, and the "front surface" and "back surface" are not limited to the vertical surfaces. They include inclined or positionally offset surfaces.

Further, the shape of the terminal portion or the nut is not limited to the above-mentioned rectangular cuboid shape, and they may be triangular prism, triangular pyramid, pentagonal prism, or the like. That is, there is no dependence on their shape as long as the bolt can be fastened in two or more directions.

In the present invention, the state where "the nut is fixed" means that the nut does not fall even if the nut insertion opening of the terminal portion faces downward, and includes not only the case where the nut is fixed to the terminal portion in a static state, but also the case where the nut is fixed thereto in a movable state relative to the terminal portion due to a gap formed between the nut and the terminal portion. It further includes the case where the nut is fixed to the terminal portion by a friction force so that the nut is easily detached therefrom by applying an external force exceeding the friction force.

Advantageous Effects of Invention

Use of the terminal portion for storage batteries of the present invention enables the nut to be fixed to the terminal portion easily and reliably. In this way, the problem that the end user drops the nut can be solved by pre-fixing the nut.

Further, connection of an external lead wire to the storage battery at each of two or more points at the same time is made possible by using such a terminal portion in which a plurality of bolt insertion holes are bored at such positions as not to intersect each other within the hollow of the terminal portion, and a plurality of screw holes of the nut are formed at such positions as not to intersect each other. In contrast, in the case of a terminal portion in which two bolt insertion holes are bored at such positions as to intersect each other within the hollow of the terminal portion, and two screw holes of the nut are formed at such positions as to intersect each other, either one of the screw holes is selected and a bolt is inserted thereinto for connecting the external lead wire to the storage battery, which exerts an effect of allowing the nut to be compact and the terminal portion to be compact as well. Furthermore, when the two bolt insertion holes and the two screw holes are provided at two or more points, connection at two or more points at the same time is enabled.

Use of a terminal with a pre-fixed nut dramatically increases the working efficiency of attaching a storage battery to an automobile body. This effect is outstanding in mass production of automobiles. This effect is further outstanding in production of motorcycles. This is because a delay in assembly work caused by dropping a nut is more problematic since two-wheeled vehicles have an attachment space for storage batteries or surrounding working spaces that are smaller than those in four-wheeled vehicles.

DESCRIPTION OF EMBODIMENTS

Figure 1A:
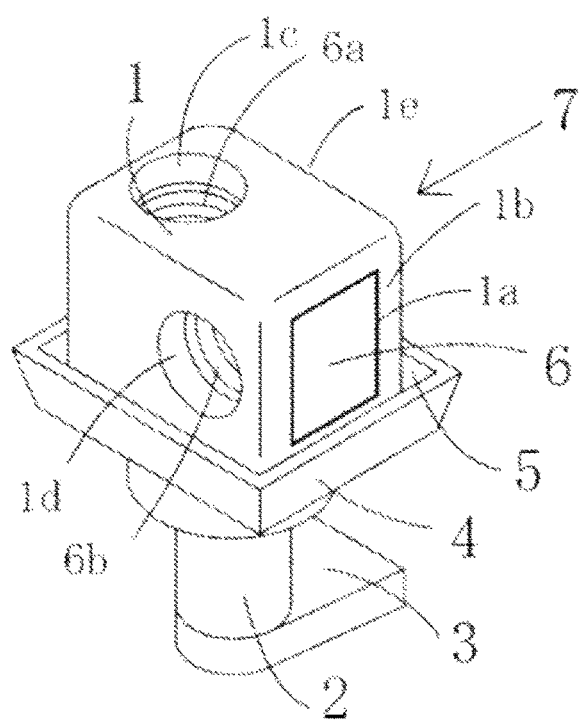
FIG. 1(a) is a perspective view (as seen from one side) showing Embodiment 1 of a terminal portion for storage batteries according to the present invention.
Figure 1B:
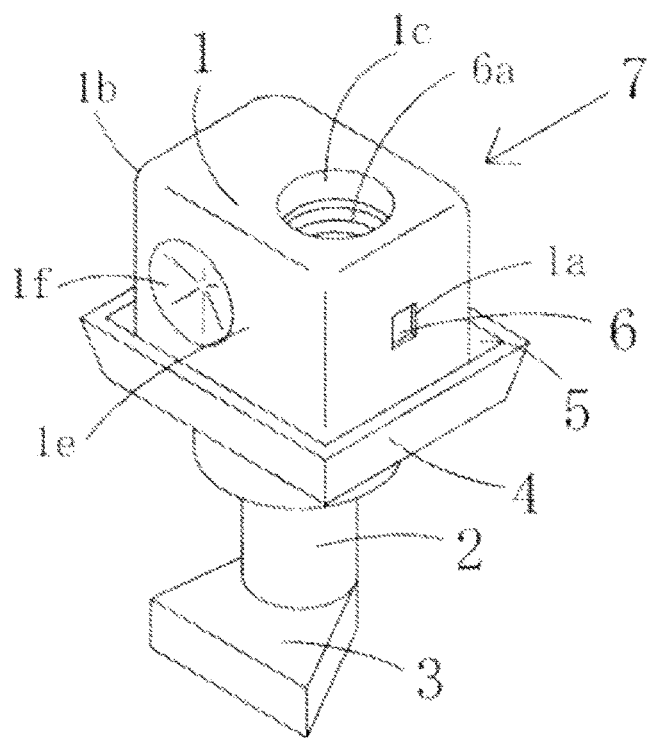
FIG. 1(b) is a perspective view (as seen from the other side) showing Embodiment 1 of the terminal portion for storage batteries according to the present invention.

FIG. 1(a) and FIG. 1(b) show Embodiment 1 of a terminal portion for storage batteries of the present invention (example when used in a plastic encapsulated terminal 7).

A rectangular cuboid terminal portion 1 for storage batteries has a hollow 1a and an insertion opening 1b into which a nut 6 is inserted. The hollow 1a into which the nut 6 is inserted is bored through the terminal portion 1 from the insertion opening 1b on the right side surface toward the left side surface in FIG. 1(a). However, the wall on the side opposite to the insertion opening 1b is preferably left so that the nut 6 is prevented from passing therethrough, as shown in FIG. 1(b). Further, a bolt insertion hole 1c and a bolt insertion hole 1d are bored respectively from the upper surface and the front surface toward the hollow 1a.

In Embodiment 1, in order to connect an external lead wire at each of two or more points at the same time, the bolt insertion hole 1c on the upper surface and the bolt insertion hole 1d on the front surface are formed at such positions as not to intersect each other within the hollow 1a, that is, a position where the bolt insertion hole 1c is offset to the left or right on the upper surface, and a position where the bolt insertion hole 1d is offset to the right or left on the front surface.

The nut 6 is inserted into the hollow 1a through the insertion opening 1b of the terminal portion 1 and fixed therein. In order to enable both of the bolt insertion hole 1c on the upper surface and the bolt insertion hole 1d on the front surface of the terminal portion 1 to be selected at the same time for inserting a bolt into the nut 6 when connecting an external lead wire to a storage battery with the nut 6 pre-fixed to the terminal portion 1, a screw hole 6a threaded from the upper surface toward the lower surface and a screw hole 6b threaded from the front surface toward the back surface of the rectangular cuboid nut 6 are formed at such positions as not to intersect each other, that is, a position where the screw hole 6a is offset to the left or right on the upper surface (lower surface), and a position where the screw hole 6b is offset to the right or left on the front surface (back surface).

The nut 6 is fixed by being inserted into the hollow 1a through the insertion opening 1b of the terminal portion 1 so that the screw hole 6a threaded from the upper surface toward the lower surface of the nut 6 is brought into communication with the bolt insertion hole 1c bored through the upper surface of the terminal portion 1, and the screw hole 6b threaded from the front surface toward the back surface of the nut 6 is brought into communication with the bolt insertion hole 1d bored through the front surface of the terminal portion 1. Accordingly, a bolt (not shown in the figure) is inserted through each of the bolt insertion hole 1c on the upper surface and the bolt insertion hole 1d on the front surface, thereby allowing the tip of each bolt to threadedly engage with the nut. Then, an external lead wire (not shown, such as a wire capable of being connected to electronic components) is fixed by being interposed between each bolt and the nut 6. In this way, an external lead wire is connected to a storage battery at each of two points at the same time in Embodiment 1.

Further, as a modification of Embodiment 1, it is made possible to connect an external lead wire to the storage battery at each of two or more points, for example, three points, or four points at the same time by employing the nut 6 in which two or more bolt insertion holes 1c on the upper surface and/or two or more bolt insertion holes 1d on the front surface of the terminal portion 1 in FIG. 1(a) are provided (in the case of "or", the number of bolt insertion holes on the other surface is zero or one), and two or more screw holes 6a threaded from the upper surface toward the lower surface and/or two or more screw holes 6b threaded from the front surface toward the back surface are provided corresponding to the bolt insertion holes.

Figure 2A:
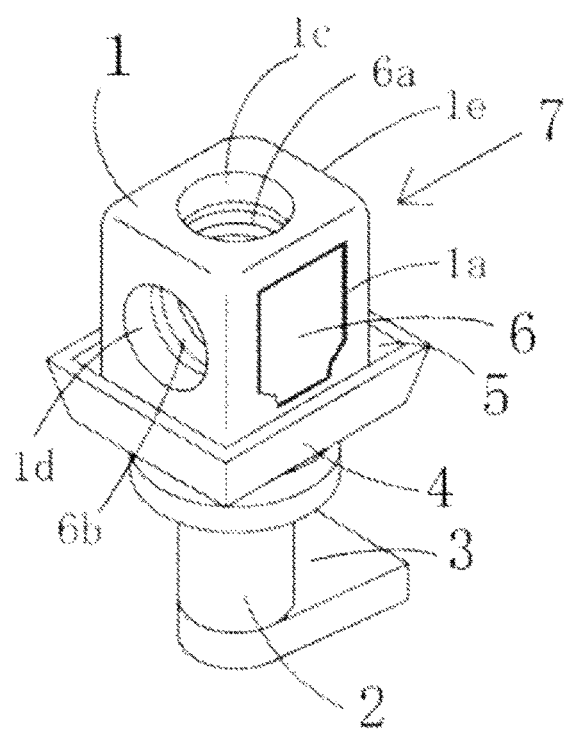
FIG. 2(a) is a perspective view (as seen from the one side) showing Embodiment 2 of the terminal portion for storage batteries according to the present invention.
Figure 2B:
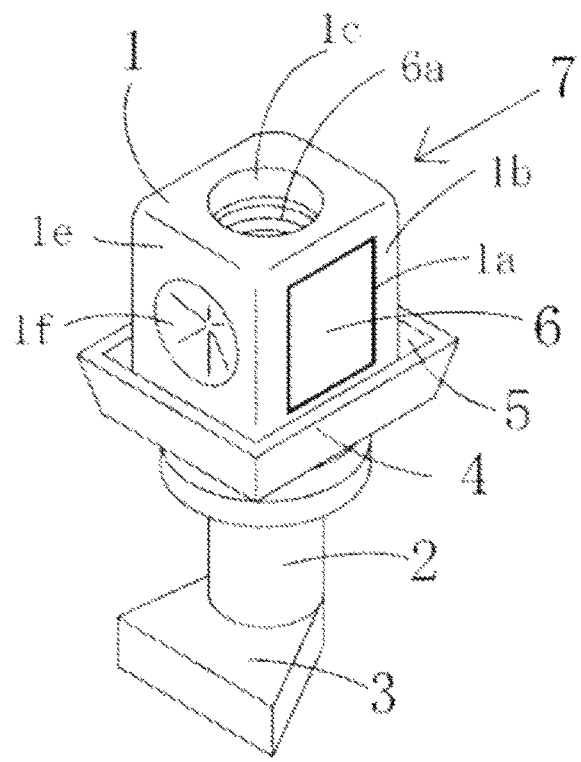
FIG. 2(b) is a perspective view (as seen from the other side) showing Embodiment 2 of the terminal portion for storage batteries according to the present invention.

FIG. 2(a) and FIG. 2(b) show Embodiment 2 of the terminal portion for storage batteries of the present invention (example when used in the plastic encapsulated terminal 7).

A rectangular cuboid terminal portion 1 for storage batteries has a hollow 1a and an insertion opening 1b into which a nut 6 is inserted. The hollow 1a into which the nut 6 is inserted is bored through the terminal portion 1 from the insertion opening 1b on a right side surface toward a left side surface in FIG. 2(b). However, the wall on the side opposite to the insertion opening 1b is preferably left so that the nut 6 is prevented from passing therethrough, as shown in FIG. 2(a). Further, a bolt insertion hole 1c and a bolt insertion hole 1d are bored respectively from the upper surface and the front surface toward the hollow 1a.

Figure 3:
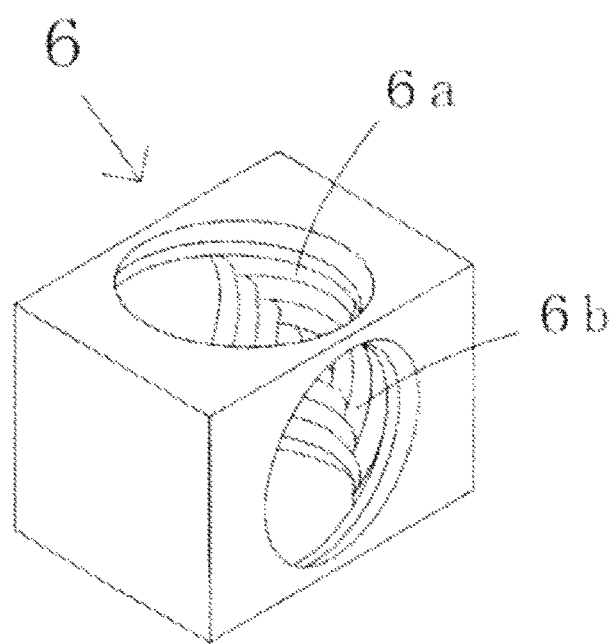
FIG. 3 is a perspective view of a nut used for the terminal portion in Embodiment 2.

In Embodiment 2, the nut 6 is inserted into the hollow 1a through the insertion opening 1b of the terminal portion 1 and fixed therein, as shown in FIG. 2(b). In order to enable either one of the bolt insertion hole 1c on the upper surface and the bolt insertion hole 1d on the front surface of the terminal portion 1 to be selected, as needed, for inserting a bolt into the nut 6 when connecting an external lead wire to a storage battery with the nut 6 pre-fixed to the terminal portion 1, a nut in which a screw hole 6a threaded from the upper surface toward the lower surface and a screw hole 6b threaded from the front surface toward the back surface of the rectangular cuboid nut 6 intersect each other is employed, as shown in FIG. 3. The screw hole 6a threaded from the upper surface toward the lower surface and the screw hole 6b threaded from the front surface toward the back surface preferably intersect each other at the center of the nut in order to use these two efficiently. However, they also may be configured to intersect each other at a position slightly offset from the center.

Also in Embodiment 2, the method for inserting the nut and the method for inserting the bolt are the same as in Embodiment 1. However, there is an effect of capable of selecting either one of the upper surface and the front surface, as needed, even if the nut 6 is fixed when connecting an external lead wire to the storage battery, since a bolt is inserted into the nut 6 by selecting either one of the bolt insertion hole 1c on the upper surface or the bolt insertion hole 1d on the front surface of the terminal portion 1.

Further, as a modification of Embodiment 2, it is made possible to select points, when connecting an external lead wire to the storage battery, from two points on the upper surface, two points on the front surface, and one point on each of the upper surface and the front surface of the terminal portion 1 in FIG. 2(a), as needed, by employing the nut 6 in which two bolt insertion holes 1c on the upper surface and two bolt insertion holes 1d on the front surface are provided, and two screw holes 6a threaded from the upper surface toward the lower surface and two screw holes 6b threaded from the front surface toward the back surface are provided corresponding to the bolt insertion holes.

Furthermore, in Embodiment 2, the nut 6 is exposed on the side opposite to the insertion opening 1b, as shown in FIG. 2(a) and FIG. 2(b), which serves to allow the nut 6 that has been fixed as described later to be forced out by hammering. In the case of the absence of such an exposed surface for forcing out the nut 6, it is also possible to employ the nut 6 in which a bolt insertion hole is provided on the side opposite to the insertion opening 1b, and a screw hole threaded from the side surface opposite to the insertion opening 1b toward the insertion opening 1b is provided instead of the screw hole 6b threaded from the front surface toward the back surface.

In Embodiments 1 and 2 described above, the outer shape of the nut. 6 is rectangular cuboid to match the hollow 1a of the rectangular cuboid terminal portion 1.

The nut 6 preferably has a rectangular cuboid shape with an upper surface (lower surface) and a front surface (back surface) in a laterally elongated substantially rectangular shape, and both side surfaces in a substantially square shape, in order to form the screw hole 6a at a position offset to the left or right on the upper surface (lower surface) and the screw hole 6b at a position offset to the right or left on the front surface (back surface).

The hollow 1a of the terminal portion 1 has a shape matching the outer shape of the nut. The outer shape of the terminal portion 1 may be cuboid or laterally elongated rectangular cuboid. The length to width ratio of the terminal portion 1 is about 1:1 to 1:1.5. The terminal portion 1 is made of a lead alloy, and is generally formed with a thick bottom in a plastic encapsulated terminal. Therefore, there may be the case where the terminal portion 1 including the bottom has a vertically long rectangular cuboid shape.

Figure 8:
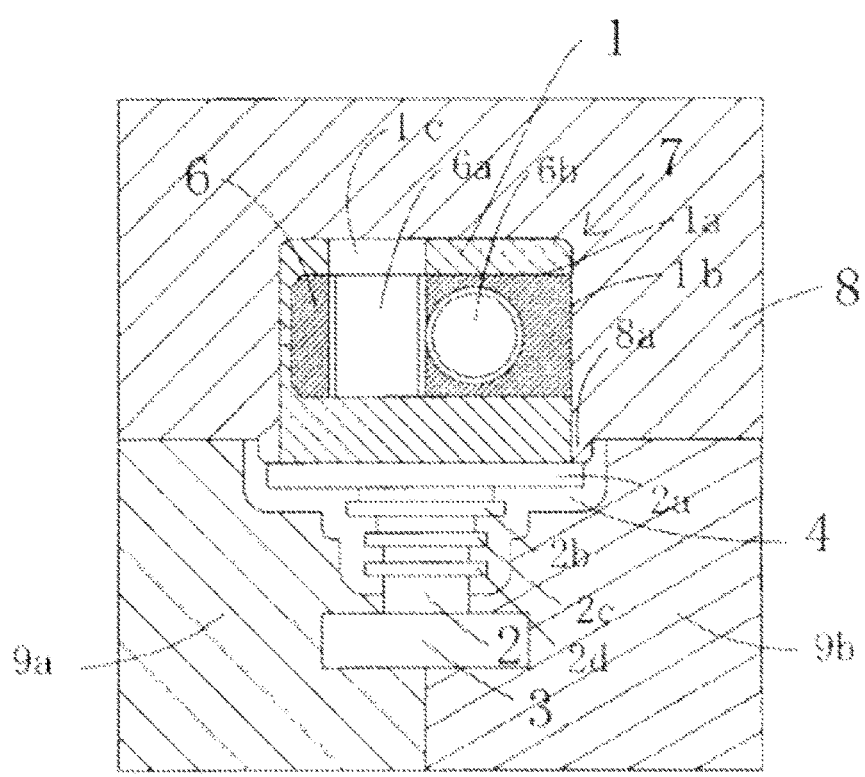
FIG. 8 is a partial sectional view (where a pole portion 2 and a base 3 are not depicted as a cross section) showing a method for forming a plastic portion of a plastic encapsulated terminal of Embodiment 1 according to the present invention.

Further, all the corners of the nut 6 may be right angled. However, it is preferable to chamfer some of the corners, so that one end of the nut 6 has an outer shape matching one end of the hollow 1a, and the other end of the nut 6 has an outer shape not matching the end of the hollow 1a. Processing into such shapes can prevent misinsertion of the nut 6. For example, supposing that the nut 6 has a shape in cross section as shown in FIG. 8, when the nut 6 is inserted into the hollow 1a of the terminal portion 1 in the correct direction, the nut 6 is arranged at such a position as to have a surface at the other end flush with the insertion opening 1b, whereas when the nut 6 is inserted thereinto in the wrong direction, the nut 6 is arranged at such a position as to have a surface at the other end projecting outwardly from the insertion opening 1b. As a result, misinsertion can be detected easily. This is particularly effective when a plurality of bolt insertion holes and a plurality of screw holes (1c, 1d, 6a, 6b) are provided respectively in the terminal portion 1 and the nut 6, where insertion of the nut in the wrong direction may cause the screw holes in the nut and the bolt insertion holes in the terminal portion to deviate from each other. In the above-mentioned example shown in FIG. 8, one end of the nut 6 is chamfered. Other than that, as examples deforming the end of the nut, the corner can be rounded, or a projection or a recess can be provided thereon. In the case where a projection is provided at one end of the nut, a recess capable of accommodating the projection is provided at a corresponding end of the hollow 1a. In the case where a recess is provided at one end of the nut, a projection capable of being accommodated in the recess is provided at a corresponding end of the hollow 1a. In either case, the other end of the nut preferably has an outer shape not matching that of the end of the hollow 1a in the case of misinsertion.

In the present invention, shapes including a cuboid shape, a shape with a deformed end as mentioned above, a shape provided with a recess to be mentioned later are collectively referred to as a "rectangular cuboid shape".

Further, the shape of the terminal portion 1 and the nut 6 is not limited to a rectangular cuboid shape, and they may be triangular prism, triangular pyramid, pentagonal prism, or the like. That is, there is no dependence on their shape as long as the bolt can be fastened in two or more directions.

In the present invention, a projecting portion that projects in the hollow direction is provided in a part, facing the hollow, on an inner surface of the terminal portion, in order to fix the nut to the terminal portion. Fixation with this structure is achieved by the friction between the projecting portion and the nut, and thus allows the nut to be detached easily by applying an external force exceeding the friction force (for example, the surface of the nut exposed on the side opposite to the insertion opening is hammered so that the nut is forced out). Further, in the case where no hole for forcing out the nut is provided on the side opposite to the insertion opening, it is also possible to provide a projection (handle) on the nut so that the nut is taken out by pulling the projection. The projecting portion can be formed, after the nut is inserted into the terminal portion, by narrowing the insertion opening through application of a pressure, or by providing a recess on a sidewall or ceiling.

As a specific method for fixing the nut 6, it is possible to employ a method in which the nut 6 is fixed, after being inserted into the hollow 1a of the terminal portion 1, by providing a recess 1f in the terminal portion 1 on a sidewall 1e (sidewall on the back surface side opposite to the front surface on which the bolt insertion hole 1d is bored), on a sidewall at a point where the bolt insertion hole 1d is not bored, or on a ceiling at a point where the bolt insertion hole 1c is not bored. The nut 6 is fixed by pressing a part of the sidewall 1e of the terminal portion 1 using a punch or the like, thereby providing the recess 1f, as shown in FIG. 1(b) and FIG. 2(b).

Further, in the case of a conventional nut having one screw hole threaded from the upper surface toward the lower surface, or from the front surface toward the back surface, the nut may be fixed, after being inserted into the hollow 1a of the terminal portion 1 so that the screw hole is brought into communication with the bolt insertion hole on the upper surface or the bolt insertion hole on the front surface of the terminal portion 1, by pressing a part of the sidewall 1e of the terminal portion 1 using a punch or the like, in the same manner as above, thereby providing the recess 1f, as shown in FIG. 2(b).

The projecting portion formed by machining is preferably provided on the sidewall 1e except the ceiling of the terminal portion. This makes it possible to avoid a problem of careless deformation of the pole portion 2 or a plastic portion 4 of the terminal portion 1 during formation of the projecting portion (the recess 1*f*) as shown in FIG. 1(*b*) and FIG. 2(*b*).

In the case where the recess 1*f* is provided by pressing the sidewall 1*e* opposite to the sidewall through which the bolt insertion hole is provided, it is preferable to press a point on the back surface side corresponding to the bolt insertion hole 1*d*. In this case, it is further preferable to provide the screw hole 6*b* passing through the nut 6 from one side to the other side. This allows the recess (projecting portion that projects in the hollow direction) if provided on the sidewall 1*e* to be arranged at a position so as to be fitted into the screw hole 6*b* of the nut 6. Use of such arrangement suppresses careless deformation of the terminal portion 1 since there is a space in which the projecting portion (recess) if projecting in the hollow direction is formed. When providing the recess 1*f* on the sidewall 1*e*, the shape of the projection with an optimal size for deforming the wall is selected.

Furthermore, recesses may be provided respectively on both of a pair of sidewalls of the terminal portion by pinching the pair of sidewalls with a tool. Further, it is also possible to fix the nut by pressing a corner of the terminal portion using a punch or the like, thereby providing a recess over two sidewalls that form the corner.

In Embodiment 3, the nut 6 is fixed, after being inserted into the hollow 1*a* of the terminal portion 1, by narrowing the insertion opening 1*b* through application of a pressure by pinching with a tool.

Figure 4A:
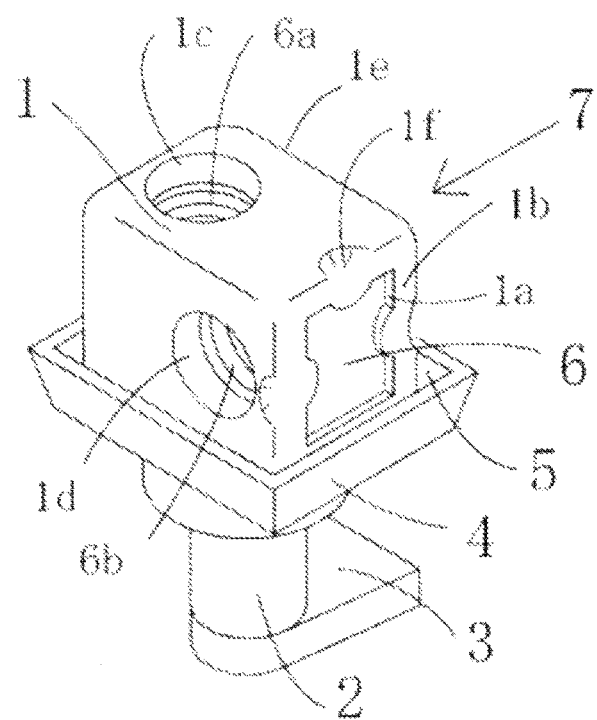
FIG. 4(a) is a perspective view (as seen from the one side) showing Embodiment 3 of the terminal portion for storage batteries according to the present invention.
Figure 4B:
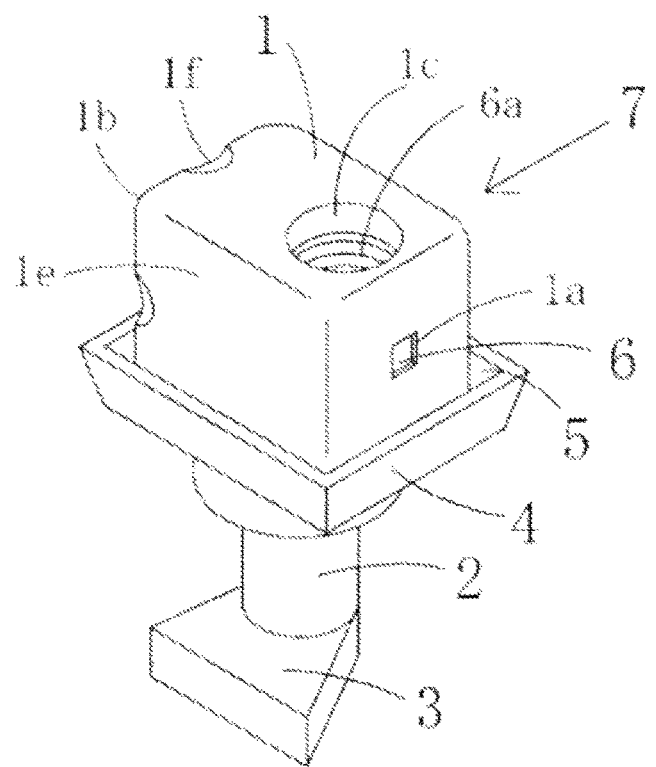
FIG. 4(b) is a perspective view (as seen from the other side) showing Embodiment 3 of the terminal portion for storage batteries according to the present invention.

In order to facilitate deformation of the insertion opening 1*b* when the nut 6 is fixed by narrowing the insertion opening 1*b* through application of a pressure, the nut 6 is arranged at a position on the back side, as seen from the insertion opening 1*b* of the hollow of the terminal portion 1, as shown in FIG. 4(*a*). Furthermore, the hollow 1*a* of the terminal portion 1 preferably has a large width at the nut insertion opening 1*b* and a reduced width on the back side. Such a configuration facilitates insertion of the nut 6 through the insertion opening 1*b* and application of a pressure to the insertion opening 1*b* or the sidewall 1*e* in the vicinity of the insertion opening 1*b*, thereby enabling the nut 6 to be fixed easily.

In the case of narrowing the insertion opening 1*b* through application of a pressure by pinching with a tool as mentioned above, it is also possible to narrow the insertion opening 1*b* by pinching the sidewalls 1*e* on the left and right of the terminal portion 1 with a tool so as to form recesses 1*f*, or by pinching the upper part and lower part (ceiling and bottom) of the terminal portion 1 with a tool so as to form the recesses 1*f*. Further, these two may be combined as shown in FIG. 4(*a*) and FIG. 4(*b*).

Instead of forming the recesses 1*f*, it is also possible to deform the insertion opening 1*b* to be uniformly narrowed entirely.

Furthermore, in order to further facilitate deformation of the insertion opening 1*b*, a recess is preferably provided in a part on the surface of the nut corresponding to the part where the insertion opening 1*b* is narrowed.

Figure 5A:
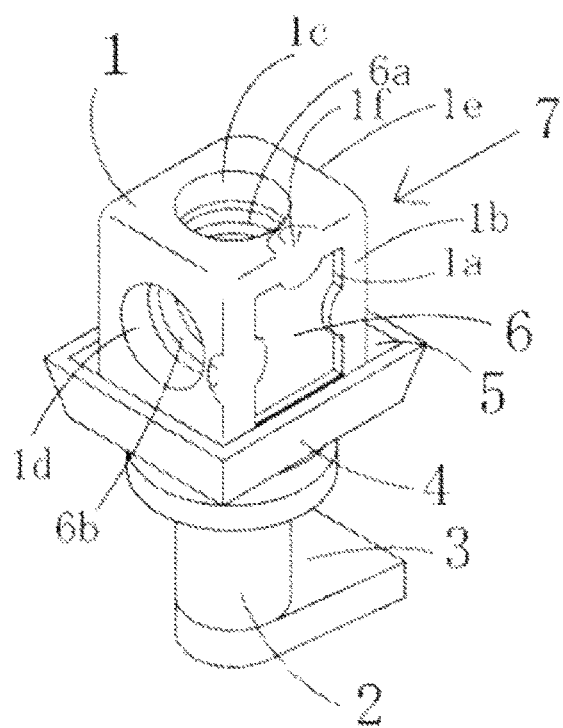
FIG. 5(a) is a perspective view (as seen from the one side) showing Embodiment 4 of the terminal portion for storage batteries according to the present invention.
Figure 5B:
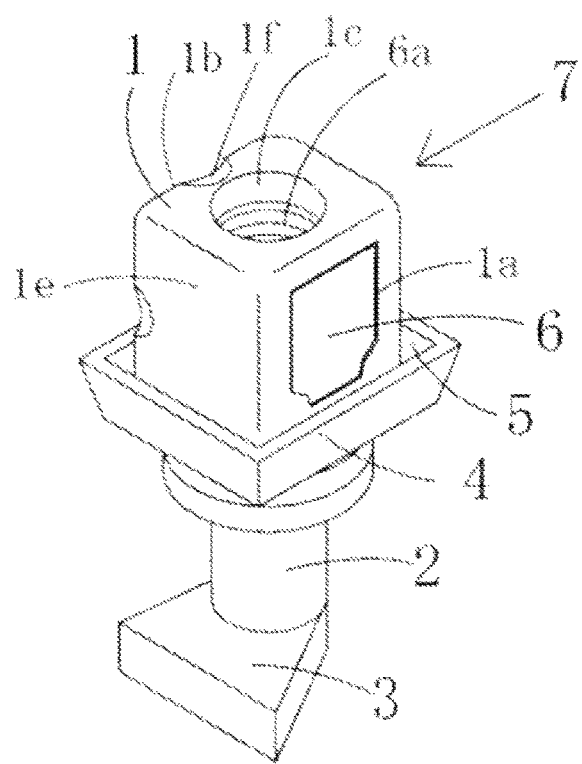
FIG. 5(b) is a perspective view (as seen from the other side) showing Embodiment 4 of the terminal portion for storage batteries according to the present invention.

In Embodiment 4 shown in FIG. 5(*a*) and FIG. 5(*b*), the nut 6 is fixed, after being arranged at a position on the back side, as seen from the insertion opening 1*b* of the hollow 1*a* of the terminal portion 1, so that the screw hole 6*a* threaded from the upper surface toward the lower surface is brought into communication with the bolt insertion hole 1*c* on the upper surface of the terminal portion 1, and the screw hole 6*b* threaded from the front surface toward the back surface is brought into communication with the bolt insertion hole 1*d* on the front surface of the terminal portion 1, by narrowing the insertion opening 1*b* of the terminal portion 1 through application of a pressure (for example, by forming the recesses 1*f*).

Further, in the case of a conventional nut having one screw hole threaded from the upper surface toward the lower surface or from the front surface toward the back surface, the nut may be fixed, after being arranged at a position on the back side, as seen from the insertion opening 1*b* of the hollow 1*a* of the terminal portion 1, so that the screw hole is brought into communication with the bolt insertion hole on the upper surface or the bolt insertion hole on the front surface of the terminal portion 1, by narrowing the insertion opening 1*b* of the terminal portion 1 through application of a pressure.

In Embodiment 5, a method for fixing the nut to the terminal portion by deforming, after the nut is inserted into the hollow of the terminal portion, the terminal portion by heating is employed. A projecting portion projecting in the hollow direction is provided in a part, facing the hollow, on an inner surface of the terminal portion by deforming the terminal portion by heating. Fixation by this structure is also achieved by the friction between the projecting portion and the nut, and thus allows the nut to be detached easily by applying an external force exceeding the friction force.

As a method for deforming the terminal portion by heating, a method of holding a heat source close to an outer surface of the terminal portion can be used. In use of this method, various welders can be used as a heat source. Examples thereof include a gas welder, a TIG welder, a plasma arc welder, and a laser welder. Among these, the gas welder is preferable because of its low cost of installation.

Figure 6A:
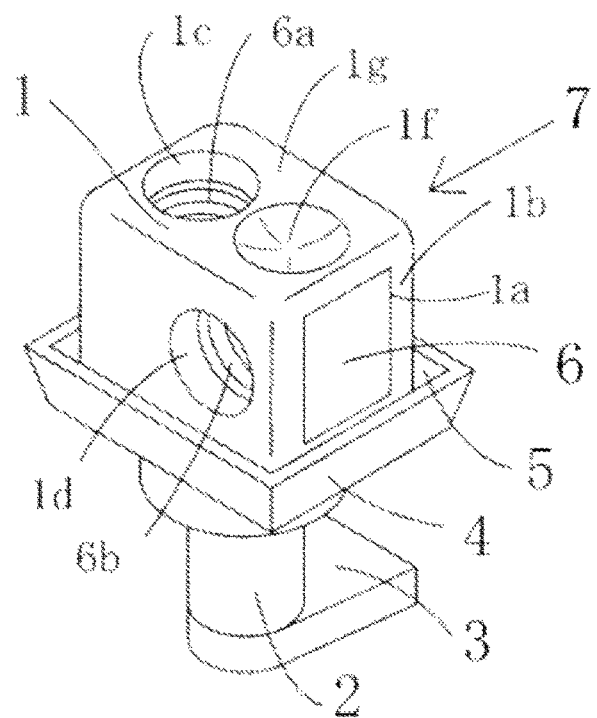
FIG. 6(a) is a perspective view (as seen from the one side) showing Embodiment 5 of the terminal portion for storage batteries according to the present invention.
Figure 6B:
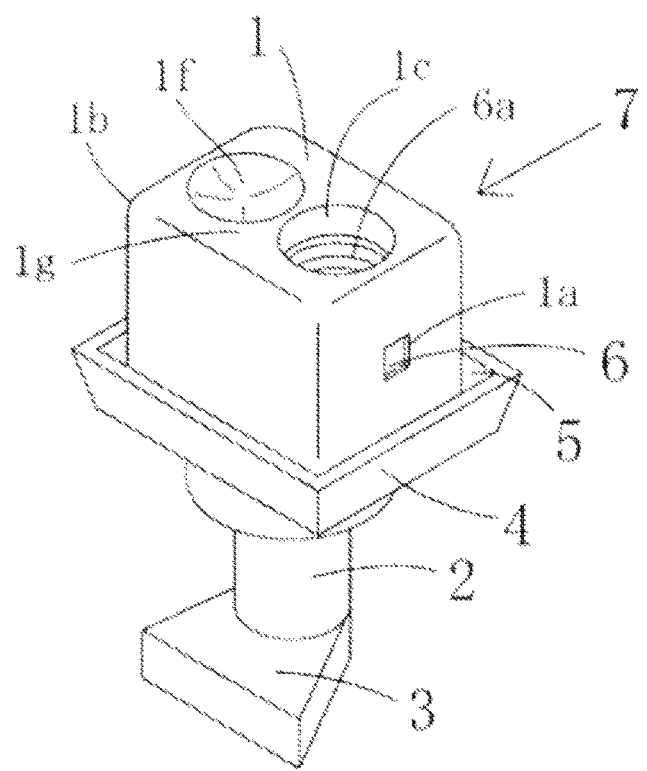
FIG. 6(b) is a perspective view (as seen from the other side) showing Embodiment 5 of the terminal portion for storage batteries according to the present invention.

As an example of the specific method for fixing the nut 6, the nut 6 is fixed, after being inserted into the hollow 1*a* of the terminal portion 1, by deforming the terminal portion 1 by heating, thereby providing the recess 1*f* (projecting portion projecting in the hollow direction) on a ceiling 1*g*, as shown in FIG. 6(*a*) and FIG. 6(*b*).

In the case where the point to be deformed is made on the ceiling 1*g* of the terminal portion, as mentioned above, the gravity acts to cause the deformation. Therefore, only a heating step is required, and there is no need for additional operations such as punching.

It is also possible to deform a point on a sidewall of the terminal portion. In such a case, it is possible to deform a target point with a small force by applying a pressure using a punch or the like, since the metal composing the terminal portion is softened by heating.

Further, the hollow 1*a* of the terminal portion 1 preferably has a large width at the nut insertion opening 1*b* and a reduced width on the back side. Such a configuration facilitates insertion of the nut 6 through the insertion opening 1*b* and deformation of the vicinity of the insertion opening 1*b* by heating, thereby enabling the nut 6 to be fixed easily.

Furthermore, in order to further facilitate deformation of the target point of the terminal portion, a recess is preferably provided at a point on the surface of the nut 6 corresponding to the point to be heated in the terminal portion.

Figure 7A:
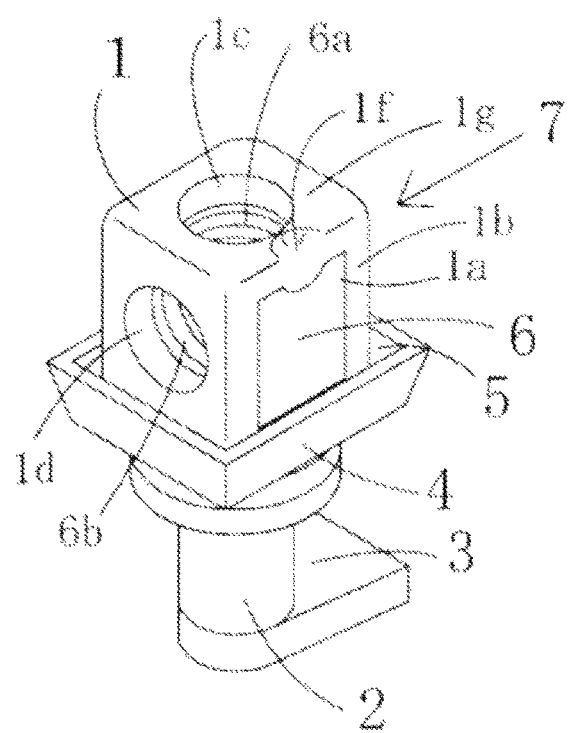
FIG. 7(a) is a perspective view (as seen from the one side) showing Embodiment 6 of the terminal portion for storage batteries according to the present invention.
Figure 7B:
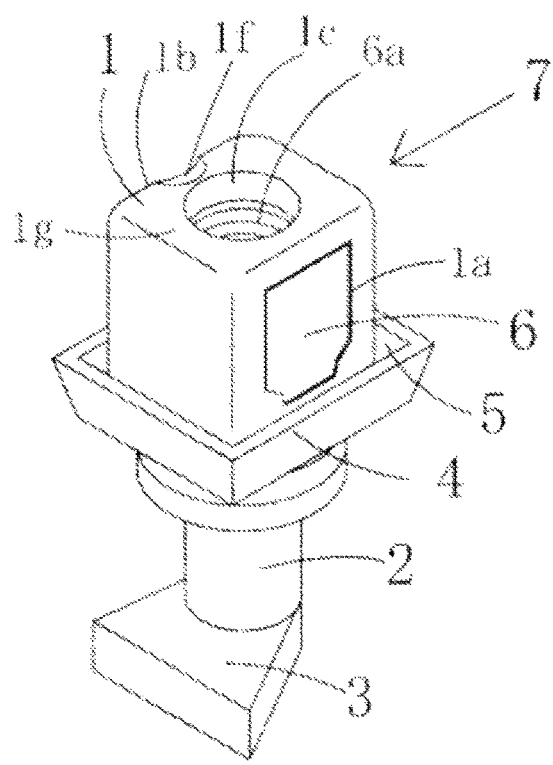
FIG. 7(b) is a perspective view (as seen from the other side) showing Embodiment 6 of the terminal portion for storage batteries according to the present invention.

In Embodiment 6 shown in FIG. 7(*a*) and FIG. 7(*b*), the nut 6 is fixed, after being inserted into the hollow 1*a* of the terminal portion 1, so that the screw hole 6*a* threaded from the upper surface toward the lower surface is brought into communication with the bolt insertion hole 1*c* on the upper surface of the terminal portion 1, and the screw hole 6*b* threaded from the front surface toward the back surface is brought into communication with the bolt insertion hole 1*d* on the front surface of the terminal portion 1, by deforming the terminal portion 1 by heating, thereby providing the recess 1*f* (projecting portion projecting in the hollow direction) on the ceiling 1*g*.

In the case of such a rectangular cuboid terminal portion as shown in FIG. 7(*a*) and FIG. 7(*b*) in which bolt insertion holes bored respectively through the upper surface and the front surface of the terminal portion 1 are formed at such positions as to intersect each other in the hollow 1a, the ceiling 1g is narrow, and therefore the nut 6 is preferably fixed by narrowing the insertion opening 1b by deforming the vicinity of the insertion opening 1 on the ceiling 1g of the terminal portion 1 by heating. It is also possible to deform the vicinity of the insertion opening 1 on surfaces other than the ceiling 1g by heating.

Further, in the case of a conventional nut having one screw hole threaded from the upper surface toward the lower surface, or from the front surface toward the back surface, the nut may be fixed, after being inserted into the hollow 1a of the terminal portion 1, so that the screw hole is brought into communication with the bolt insertion hole on the upper surface or the bolt insertion hole on the front surface of the terminal portion 1, by deforming the terminal portion 1 by heating, in the same manner as above.

The plastic encapsulated terminal of the present invention is described with reference to FIG. 1(a) and FIG. 1(b).

In the plastic encapsulated terminal 7, 1 denotes a rectangular cuboid terminal portion, 2 denotes a circular cylinder pole portion, 3 denotes a base in the form a plate, and 4 denotes a plastic portion composed of polypropylene, polyethylene, or the like. The terminal portion 1 has a lower end integrally coupled to the upper end of the pole portion 2, and the pole portion 2 has a lower end integrally coupled to the upper end of the base 3. As shown in FIG. 8, the pole portion 2 has a rectangular (shape almost similar to the bottom surface of the terminal portion) deburring flange 2a formed around its circumferential surfaces at the uppermost part, and three ribs of flanges 2b, 2c, and 2d, formed below the deburring flange 2a at intervals, each having a diameter smaller than the length of one side of the deburring flange 2a. The deburring flange 2a has a circumferential surface projecting in the horizontal direction from the circumferences at the lower end of the terminal portion 1. The plastic portion 4 is formed in the surroundings of the pole portion 2 so as to wrap the deburring flange 2a and the flanges 2b, 2c, and 2d, then slightly extends outward from the upper end of the flange 2a, and rises upward so as to cover the circumferential surfaces in the lower part of the terminal portion 1 via a groove 5.

Next, a method for forming a plastic portion of the plastic encapsulated terminal according to Embodiment 1 of the present invention is described with reference to FIG. 8.

When producing a plastic encapsulated terminal, a metal portion integrally including the terminal portion 1, the pole portion 2, and the base 3 is first produced by pouring a lead alloy into a casting mold (not shown in the figure). Since the plastic encapsulated terminal is required to have a certain hardness, Pb—Ca—Sn alloys are preferably used.

Next, this metal portion is placed in a plastic mold composed of an upper plastic mold 8 and a two-part lower plastic mold 9a, 9b, as shown in FIG. 8, so that a plastic molding space is formed within the plastic mold. Subsequently, a plastic such as polypropylene is poured into the plastic molding space within the plastic mold. After curing of the plastic, the upper plastic mold 8 and the lower plastic mold 9a, 9b are removed, so that the plastic encapsulated terminal 7 with the plastic portion 4 formed in the surroundings of the pole portion 2 is obtained.

Even if a gap is present between the side surface of the terminal portion 1 and the side surface of the groove of the upper plastic mold 8, it is possible to prevent the plastic from entering this gap by forming the plastic portion 4 with the upper surface of the deburring flange 2a and the lower surface of a projection 8a of the upper plastic mold 8 being in tight contact with each other, as shown in FIG. 8, thus preventing formation of burrs on the side surfaces of the terminal portion 1.

A first method for producing a plastic encapsulated terminal according to the present invention is a method in which a plastic portion is formed: after the rectangular cuboid nut 6 in which the screw holes 6a and 6b respectively threaded from the upper surface toward the lower surface and from the front surface toward the back surface are formed at such positions as not to intersect each other is inserted into the hollow 1a of the rectangular cuboid terminal portion 1 having the bolt insertion holes 1c and 1d bored respectively through the upper surface and the front surface and having the other end to which the pole portion 2 is coupled, as mentioned above, so that the screw holes 6a and 6b are brought into communication respectively with the bolt insertion holes 1c and 1d; or after a rectangular cuboid nut having one screw hole is inserted thereinto, so that the screw hole is brought into communication with the bolt insertion hole on the upper surface or the bolt insertion hole on the front surface of the terminal portion, and fixed therein. According to this production method, the plastic portion 4 is not yet present during the operation of fixing the nut 6 to the terminal portion 1, and therefore the plastic portion 4 is suppressed from deforming or deteriorating due to the fixing operation.

A second method for producing a plastic encapsulated terminal according to the present invention is a method in which the nut 6 is fixed, after the plastic portion 4 is formed, within the hollow 1a of the terminal portion 1, as mentioned above. According to this production method, since the plastic portion 4 can be formed before the terminal portion 1 is deformed due to the operation of fixing the nut 6, it is possible to facilitate the work of fitting the terminal portion 1 into the later-mentioned plastic mold (the upper plastic mold 8 and the lower plastic mold 9a, 9b), or to suppress the decrease in dimensional accuracy of the plastic portion 4 and the degree of contact between the plastic portion 4 and the terminal portion 1. The terminal portion 1 or the pole portion 2 may be carelessly deformed in some cases due to operation of fixing the nut 6. In such a case, it is made impossible to assemble the plastic mold accurately so as to be fitted to the surroundings of the terminal portion 1, which has been a problem. Further, dimensions of the plurality of flanges 2a, 2b, 2c, and 2d of the pole portion 2 are designed with high accuracy; however, when they are carelessly deformed, it is made impossible to maintain their dimensional accuracy, which also has been a problem. Such problems that have been caused by careless deformation of the terminal portion 1 are improved by performing the step of forming the plastic portion 4 before the terminal portion 1 is deformed, thereby enabling the production of terminals with high productivity and high dimensional accuracy.

A third method for producing a plastic encapsulated terminal according to the present invention is a method in which the nut 6 is fixed within the hollow 1a of the terminal portion 1 at the time of molding the plastic portion 4.

Figure 9:
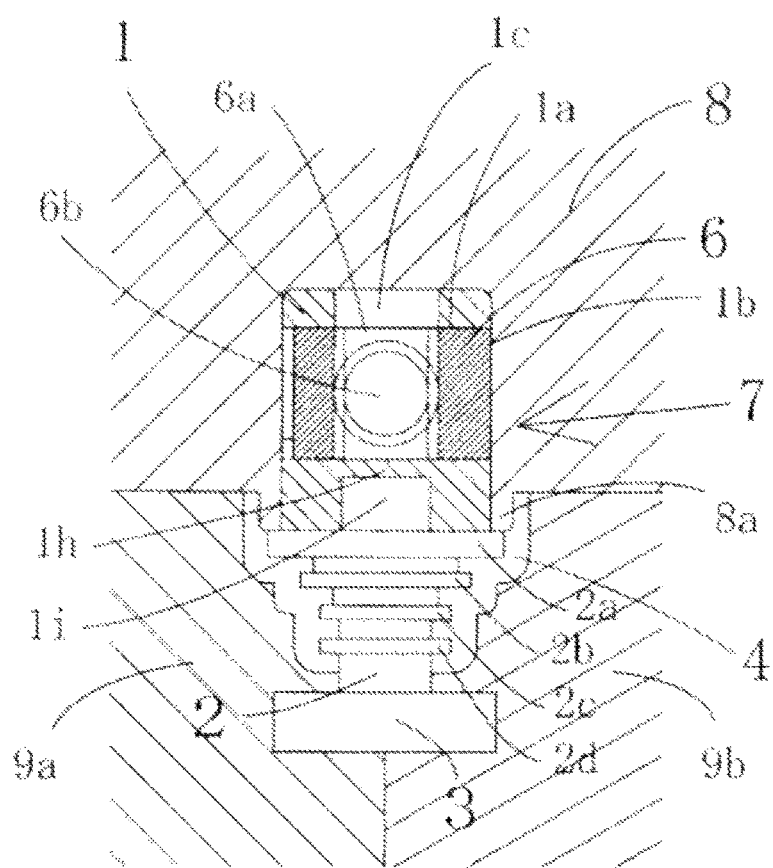
FIG. 9 is a partial sectional view (where the pole portion 2 and the base 3 are not depicted as a cross section) showing a method for forming a plastic portion of a plastic encapsulated terminal of Embodiment 2 according to the present invention.

An example in which this third method is applied to the plastic encapsulated terminal of Embodiment 2 according to the present invention is described with reference to FIG. 9.

That is, it is possible to employ a method in which the nut 6 is pressed to be fixed, after the rectangular cuboid nut 6 in which the screw holes 6a and 6b threaded respectively from the upper surface toward the lower surface and from the front surface toward the back surface intersect each other is inserted into the hollow 1a of the rectangular cuboid terminal portion 1 which has the bolt insertion holes 1c and 1d bored respectively through the upper surface and the front surface and to which the pole portion 2 is coupled at the other end, as mentioned above, so that the screw holes 6a and 6b are respectively brought into communication with the bolt insertion holes 1c and 1d, by injecting a plastic through a plastic injection hole 1i into a bottom 1h of the terminal portion 1 so as to deform the bottom 1h located below the hollow 1a at the time of molding the plastic portion 4.

In this third method, the plastic injection hole 1i is provided at the bottom 1h of the terminal portion 1, and a plastic is fed to the bottom 1h of the terminal portion 1 at the time of molding the plastic portion 4. Then, the bottom 1h located below the hollow 1a is deformed by the plastic injected through the plastic injection hole 1i due to the pressure at the time of the molding, so that the nut 6 is pressed and fixed. It is preferable that the bottom 1h be formed so as to have a part with a reduced thickness of lead alloy so that such part is easily deformed due to the pressure at the time of the molding. According to this method, the nut 6 can be fixed to the terminal portion 1 at the time of molding the plastic portion 4, the plastic encapsulated terminal 7 is accomplished simultaneously with the fixation of the nut 6.

Figure 10:
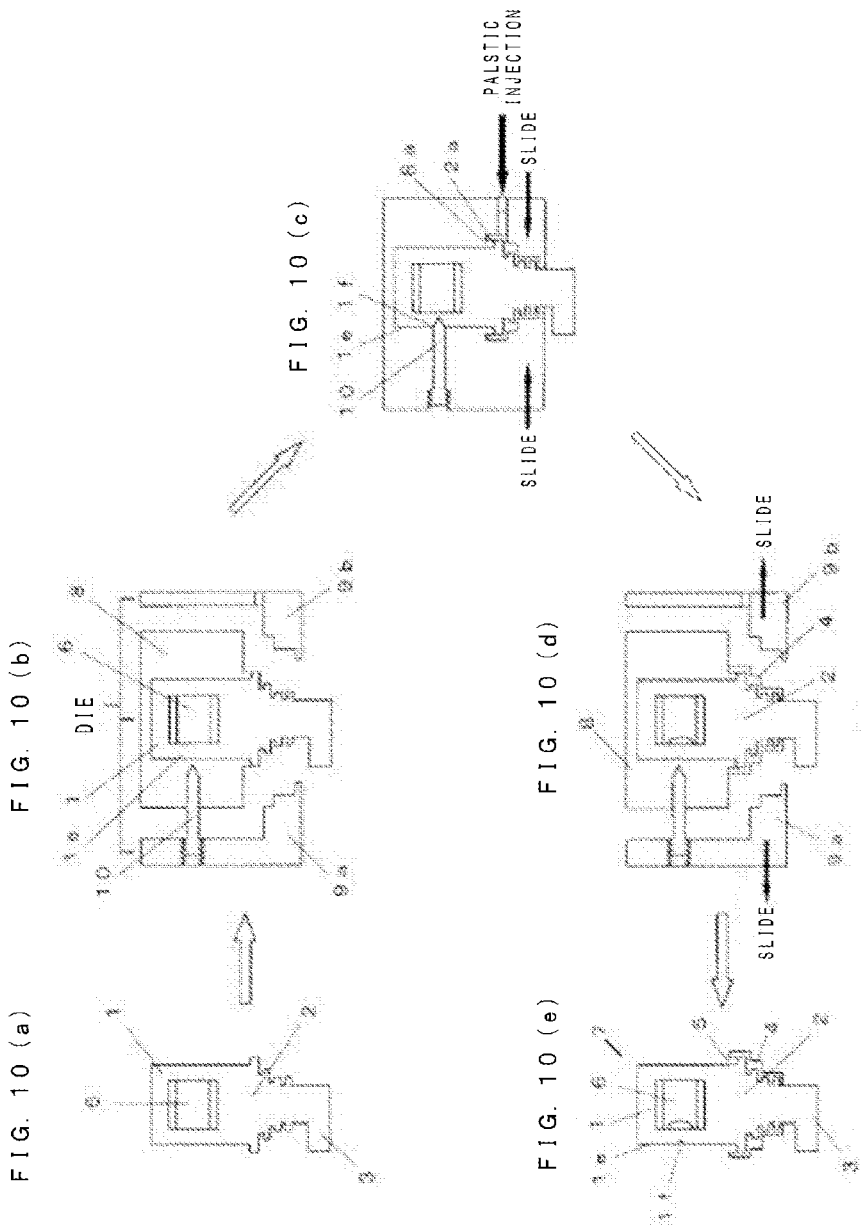
FIG. 10 is a flow diagram showing an example of a method for producing the plastic encapsulated terminal of the present invention.

Further, a fourth method for producing a plastic encapsulated terminal according to the present invention is described with reference to the flow diagram of FIG. 10.

This fourth method is characterized in that the nut 6 is fixed by applying a pressure to the sidewall 1e of the terminal portion 1 using a pressing pin provided in the plastic mold for plastic molding, thereby providing the recess 1f on the sidewall 1e, at the time of plastic molding of the plastic encapsulated terminal.

When producing the plastic encapsulated terminal, a lead alloy is first poured into a mold (not shown in the figure) to produce a metal portion (terminal) integrally including the terminal portion 1, the pole portion 2, and the base 3. Then, the nut 6 is inserted into the terminal portion 1 of this terminal, as shown in FIG. 10(a).

Next, this terminal is placed in a plastic mold composed of the upper plastic mold 8 and the two-part lower plastic mold 9a, 9b as shown in FIG. 10(b), and a plastic molding space is formed within the plastic mold.

In the fourth method, it is preferable that a pressing pin 10 be threadedly fixed to the lower plastic mold 9a of the plastic mold in advance, and a pressure be applied to the sidewall 1e of the terminal portion 1 by screwing the pressing pin 10 simultaneously with operation of fitting the terminal into the plastic mold (operation of fitting the terminal with the upper plastic mold 8 to the lower plastic mold 9a, 9b), as shown in FIGS. 10(b) and (c). This enables the motion of fitting the terminal into the plastic mold to be used for applying a pressure to the sidewall 1e of the terminal portion 1. Further, it is possible to control the shape of the recess 1f to be formed on the sidewall 1e by varying the degree of pressing the pressing pin 10 through the degree of screwing the pressing pin 10, to vary the pressure applied to the sidewall 1e of the terminal portion 1.

It is also possible to apply a pressure using the pressing pin after the terminal has been fitted into the plastic mold, however, in which a mechanism for moving the pressing pin back and forth is rendered necessary. Therefore, it is preferable that the pressure be applied at the time of operation of fitting the terminal into the plastic mold, in order to achieve an apparatus with low cost.

In the case where the lower plastic mold 9a, 9b is formed extending up to an upper part of the terminal portion 1, a recess may be provided on an upper wall of the terminal portion 1 by arranging the pressing pin 10 in an upper part of the lower plastic mold 9a, 9b and applying a pressure to the upper wall of the terminal portion 1.

Mechanisms surrounding the pressing pin are preferably as follows.

The pressing pin 10 has a base with an externally threaded portion that is threadedly engaged to an internally threaded portion of the plastic mold. A pressure is applied to the sidewall 1e of the terminal portion 1 by sliding of the plastic mold, as shown in FIG. 10(c). In that case, the projecting length at the tip of the pressing pin 10 is adjustable by screwing the pin itself, and can be set arbitrarily. By setting the projecting length before sliding the plastic mold, it is possible to form the recess 1f with a desired depth on the sidewall 1e of the terminal portion 1 when the plastic mold is pressed thereagainst.

After the nut 6 is fixed to the terminal through application of a pressure to the sidewall 1e of the terminal portion 1 by the pressing pin 10 provided in the plastic mold at the time of closing the plastic mold, a plastic such as polypropylene is poured into the plastic molding space within the plastic mold, as conventional. After curing of the plastic, the upper plastic mold 8 and the lower plastic mold 9a, 9b are removed, and thus the plastic encapsulated terminal 7 with the plastic portion 4 formed in the surroundings of the pole portion 2 is obtained, as shown in FIG. 10(d) and FIG. 10(e).

Even if a gap is present between the side surface of the terminal portion 1 and the side surface of the groove of the upper plastic mold 8, it is possible to prevent the plastic from entering this gap by forming the plastic portion 4 with the upper surface of the deburring flange 2a and the lower surface of a projection 8a of the upper plastic mold 8 being in tight contact with each other, as shown in FIG. 10(c), thus preventing formation of burrs on the side surface of the terminal portion 1.

Figure 11:
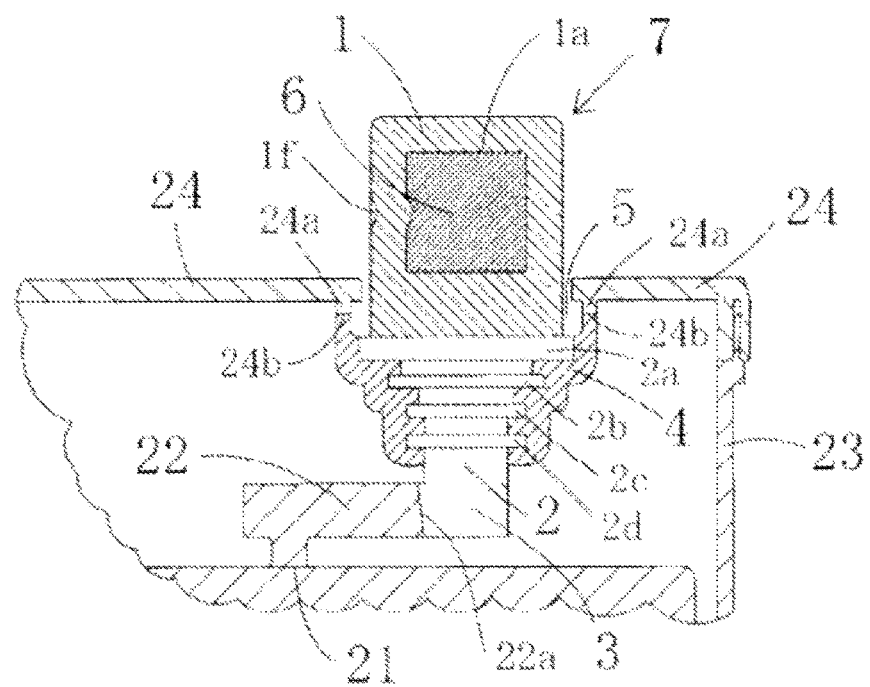
FIG. 11 is a partial sectional view (where the pole portion 2 and the base 3 are not depicted as a cross section) of a lead-acid storage battery including the plastic encapsulated terminal of Embodiment 1 according to the present invention.
Figure 12:
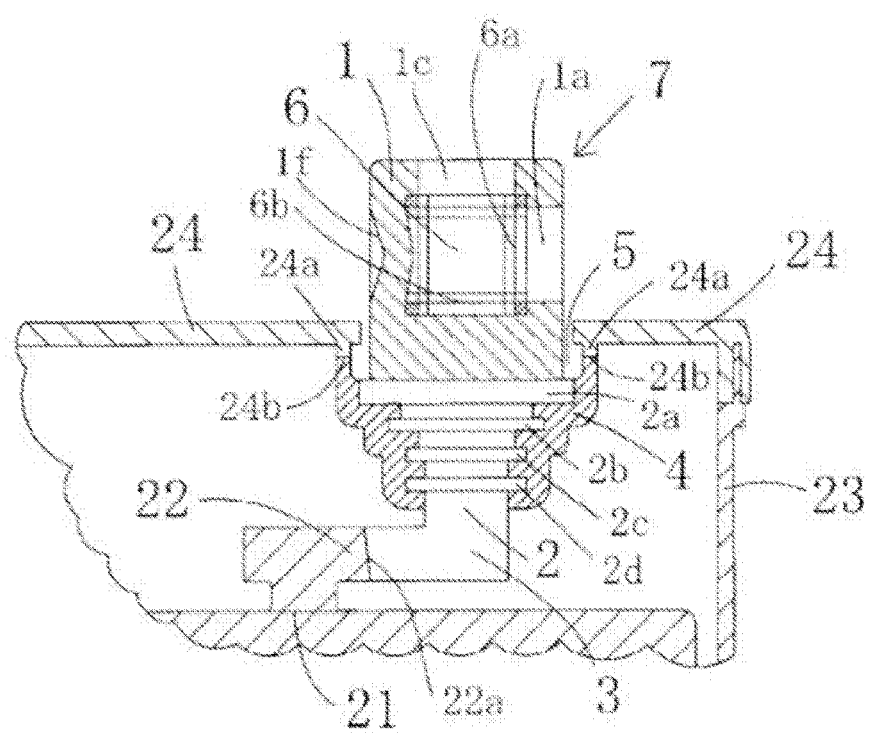
FIG. 12 is a partial sectional view (where the pole portion 2 and the base 3 are not depicted as a cross section) of a lead-acid storage battery including the plastic encapsulated terminal of Embodiment 2 according to the present invention.

The thus produced plastic encapsulated terminal 7 is joined to a cover of a lead-acid storage battery, as shown in FIG. 11 and FIG. 12.

An end of the base 3 forming a part of the plastic encapsulated terminal 7 and a strap 22 formed integrally with an electrode assembly 21 in advance, for example, by the COS process are joined together by welding, thereby forming a weld joint portion 22a. Further, when a battery case 23 and a cover 24 are welded together, the upper surface of the plastic portion 4 and a projection 24a provided on the inner surface of the cover 24 are joined together, thereby forming a weld bonded portion 24b. The air tightness and liquid tightness within the plastic encapsulated terminal 7 are ensured by the welding of the plastic portion 4 to the projection 24a provided on the lower surface of the cover 24, the adhesion of the plastic portion 4 to the plurality of flanges 2b, 2c, and 2d formed on the outer circumferential surface of the pole 2, and the creepage distance thereof.

Examples of application of the present invention to a plastic encapsulated terminal and a lead-acid storage battery provided with a plastic encapsulated terminal have been described above. However, the present invention also can be applied to a terminal portion for storage batteries, as disclosed in Non Patent Literature 2, in which a rectangular cuboid terminal portion having a hollow and an insertion opening for insertion of a nut and having bolt insertion holes bored through the upper surface and the front surface at such positions as not to intersect each other within the hollow is formed by integral molding so as to be coupled via a conductive portion to a tubular bushing welded with a pole extending from an electrode assembly in a battery case being inserted thereto.

In such a case, after a nut in which screw holes threaded from the upper surface toward the lower surface and from the front surface toward the back surface of the nut are formed at such positions as not to intersect each other is inserted into the above-mentioned hollow of the terminal portion, so that the screw holes are brought into communication with bolt insertion holes of the terminal portion, the nut may be fixed, for example, by narrowing the insertion opening of the terminal portion, providing a recess on a sidewall or ceiling of the terminal portion, or deforming the terminal portion by heating, in the same manner as in the case of the plastic encapsulated terminal.

Further, in production of storage batteries, such a terminal portion formed by integral molding as mentioned above can be attached to a cover made of a synthetic resin by insert molding, as conventional.

Furthermore, the nut can be fixed also by applying a pressure to the wall of the terminal portion using a pressing pin provided in the plastic mold for plastic molding, thereby providing a recess on the wall, in the same manner as in production of plastic encapsulated terminals.

In the case where fixation is achieved by the molding pressure for the plastic, the nut in which screw holes threaded respectively from the upper surface toward the lower surface and from the front surface toward the back surface intersect each other is fixed, after being inserted into a hollow of a terminal portion for storage batteries formed by integral molding of: a terminal portion that has the hollow and an insertion opening for insertion of the nut and has bolt insertion holes bored respectively through the upper surface and the front surface at such positions as to intersect each other within the hollow; a tubular bushing welded with a pole extending from an electrode assembly in a battery case being inserted thereinto; and a conductive portion coupling the two, by insert molding to a cover made of a synthetic resin. The injection-molding pressure of the synthetic resin in the insert molding deforms the bottom of the terminal portion, so that the nut is pressed and fixed to the hollow portion of the terminal portion.

Figure 13:
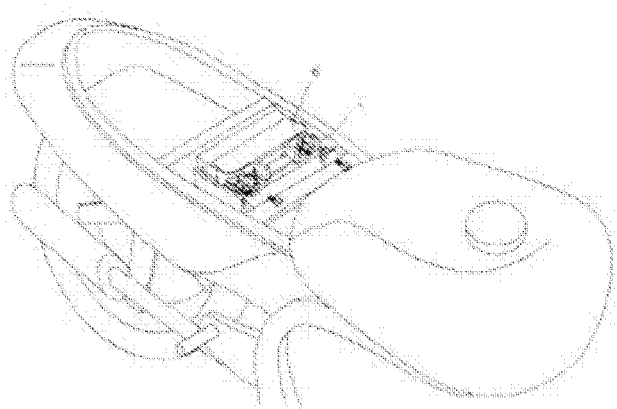
FIG. 13 is a view showing a state where a storage battery having the terminal of the present invention is mounted on a motorcycle.
Figure 14:
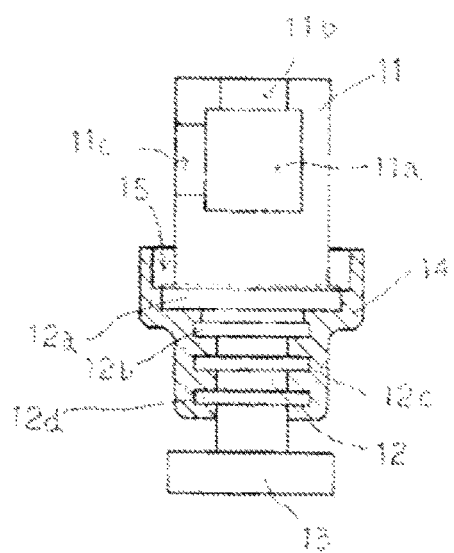
FIG. 14 is a partial sectional view (where a pole portion 12 and a base 13 are not depicted as a cross section) of a conventional plastic encapsulated terminal.

FIG. 13 shows a state where a storage battery having the terminal of the present invention is mounted on a motorcycle.

As shown in FIG. 13, when mounting the battery on the motorcycle, it is necessary to place the battery within a very narrow space. Further, although some motorcycles are equipped with a center stand, most motorcycles are equipped only with a side stand. In the latter cases, attachment of the battery is performed while such a motorcycle is inclined to the ground, and therefore a nut unfixed to a terminal may be dropped in the attachment in some cases, which is inconvenient. In the storage battery of the present invention, the nut 6 is pre-fixed to the terminal portion 1, as shown in FIG. 13. Therefore, it is possible to provide convenient storage batteries.

REFERENCE SIGNS LIST

1: Terminal Portion
1a: Hollow
1b: Insertion Opening
1c: Bolt Insertion Hole (upper surface)
1d: Bolt Insertion Hole (front surface)
1e: Sidewall
1f: Recess
1g: Ceiling
1h: Bottom
1i: Plastic Injection Hole
2: Pole Portion
2a: Deburring Flange
2b, 2c, 2d: Three Ribs of Flanges (each having a diameter smaller than the length of one side of 2a)
3: Base
4: Plastic Portion
5: Groove
6: Nut
6a: Screw Hole (threaded from the upper surface toward the lower surface)
6b: Screw Hole (threaded from the front surface toward the back surface)
7: Plastic Encapsulated Terminal
8: Upper Plastic mold
8a: Projection (of the upper plastic mold 8)
9a, 9b: Two-Part Lower Plastic mold
10: Pressing Pin
21: Electrode Assembly
22: Strap
22a: Weld Joint Portion
23: Battery Case
24: Cover
24a: Projection (on the inner surface of the cover 24)
24b: Weld Bonded Portion

INDUSTRIAL APPLICABILITY

A storage battery provided with the terminal portion of the present invention includes a nut pre-fixed to the terminal portion, and is therefore useful as a storage battery for motorcycles in which the attachment space for the storage battery and the surrounding working space are small.

The invention claimed is:
1. A storage battery comprising:
a terminal portion for storage batteries having a plurality of bolt insertion holes bored in one or a plurality of directions, a nut insertion opening through which a nut is inserted, and a hollow in communication with the bolt insertion holes and the nut insertion opening; and
the nut having at least one screw hole threaded in a direction coincident with the at least one or a plurality of directions,
wherein the terminal portion further comprises a fixation portion that fixes the nut to the terminal portion such that the nut does not fall when the nut insertion opening faces downward in a vertical direction, the fixation portion being formed by deforming the terminal portion in a state where the nut is inserted through the nut insertion opening into the hollow and the at least one screw hole of the nut is in communication respectively with the at least one of the plurality of bolt insertion holes.
2. The storage battery according to claim 1, wherein the fixation portion is a projecting portion projecting in the hollow direction in a part, facing the hollow, on an inner surface of the terminal portion.
3. The storage battery according to claim 1, wherein the fixation portion is a part of the nut insertion opening that is narrowed after the nut is inserted into the hollow of the terminal portion.
4. The storage battery according to claim 3, wherein the hollow of the terminal portion is elongated in a direction in which the nut is inserted, and
the nut is arranged at a position on the back side, as seen from the nut insertion opening of the hollow of the terminal portion.

5. The storage battery according to claim 1, wherein
the fixation portion is a part of a sidewall or ceiling of the terminal portion in which a recess is provided after the nut is inserted into the hollow of the terminal portion.

6. The storage battery according to claim 1, wherein
the plurality of bolt insertion holes are bored at such positions as not to intersect each other within the hollow of the terminal portion, and
the plurality of screw holes of the nut are formed at such positions as not to intersect each other.

7. The storage battery according to claim 1, wherein
the plurality of bolt insertion holes are bored at such positions as to intersect each other within the hollow of the terminal portion, and
the plurality of screw holes of the nut are formed at such positions as to intersect each other.

8. The storage battery according to claim 1, wherein
the hollow of the terminal portion has a large width at the nut insertion opening and a reduced width on the back side.

9. The storage battery according to claim 1, wherein
the storage battery comprises a plastic encapsulated terminal for storage batteries comprising:
the terminal portion;
a pole portion coupled to a lower end of the terminal portion; and
a plastic portion surrounding a circumferential surface of the pole portion.

10. A method for producing the storage battery according to claim 1, the method comprising:
a step of fixing the nut by deforming the terminal portion with the nut being inserted through the nut insertion opening into the hollow and the at least one screw hole of the nut being in communication respectively with the at least one of the plurality of bolt insertion holes.

11. The method according to claim 10, wherein
the nut is fixed, after the nut is inserted into the hollow, by narrowing the nut insertion opening through application of a pressure, or providing a recess on a sidewall or ceiling of the terminal portion.

12. The method according to claim 10, wherein
the nut is fixed, after the nut is inserted into the hollow, by deforming the terminal portion by heating.

13. The method according to claim 10, wherein
the nut is fixed, after the nut is inserted into the hollow of the terminal portion, by placing the terminal portion into a plastic mold for plastic molding and applying a pressure to a wall of the terminal portion using a pressing pin provided in the plastic mold for plastic molding, thereby providing a recess on the wall.

14. The storage battery according to claim 1, further comprising:
a battery case inside of which is partitioned by partition walls into a plurality of cells and in which an electrode assembly is housed in each of the cells; and
a cover lying over the battery case from above, wherein
the cover comprises the terminal portion.

15. An automobile equipped with the storage battery according to claim 14.

16. A terminal portion for storage batteries comprising:
a plurality of bolt insertion holes bored in one or a plurality of directions;
a nut insertion opening through which a nut is inserted;
a hollow in communication with the bolt insertion holes and the nut insertion opening; and
a fixation portion that fixes the nut to the terminal portion such that the nut does not fall when the nut insertion opening faces downward in a vertical direction, the fixation portion being formed by deforming the terminal portion in a state where the nut is inserted through the nut insertion opening into the hollow and the at least one screw hole of the nut is in communication respectively with the at least one of the plurality of bolt insertion holes.

17. The storage battery according to claim 1, wherein
the fixation portion is provided on a sidewall on a back surface side opposite to a front surface on which one of the plurality of bolt insertion holes is bored, a sidewall at a point where the one of the plurality of bolt insertion holes is not bored or a ceiling at a point where another one of the plurality of bolt insertion holes is not bored.

18. The storage battery according to claim 16, wherein
the fixation portion is provided on a sidewall on a back surface side opposite to a front surface on which one of the plurality of bolt insertion holes is bored, a sidewall at a point where the one of the plurality of bolt insertion holes is not bored or a ceiling at a point where another one of the plurality of bolt insertion holes is not bored.

* * * * *